United States Patent
Reilly et al.

(10) Patent No.: US 9,793,023 B2
(45) Date of Patent: Oct. 17, 2017

(54) RECOVERY OF URANIUM FROM AN IRRADIATED SOLID TARGET AFTER REMOVAL OF MOLYBDENUM-99 PRODUCED FROM THE IRRADIATED TARGET

(71) Applicant: Los Alamos National Security, LLC, Los Alamos, NM (US)

(72) Inventors: Sean Douglas Reilly, Los Alamos, NM (US); Iain May, Los Alamos, NM (US); Roy Copping, Santa Fe, NM (US); Gregory Edward Dale, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 309 days.

(21) Appl. No.: 14/042,115

(22) Filed: Sep. 30, 2013

(65) Prior Publication Data

US 2015/0085964 A1    Mar. 26, 2015

Related U.S. Application Data

(63) Continuation-in-part of application No. 14/038,424, filed on Sep. 26, 2013.

(51) Int. Cl.
*G21G 1/02* (2006.01)
*G21G 1/08* (2006.01)
(Continued)

(52) U.S. Cl.
CPC .............. *G21G 1/04* (2013.01); *G21C 19/46* (2013.01); *G21G 2001/0036* (2013.01); *G21G 2001/0094* (2013.01); *Y02W 30/883* (2015.05)

(58) Field of Classification Search
CPC .............. G21G 2001/0036; G21G 2001/0047
See application file for complete search history.

(56) References Cited

U.S. PATENT DOCUMENTS 3,382,152 A    5/1968 Lieberman et al.
3,468,808 A    9/1969 Arino
(Continued)

FOREIGN PATENT DOCUMENTS

WO    0153205    7/2001
WO    2011081576    8/2011
(Continued)

OTHER PUBLICATIONS

IAEA-TECDOC-515 "Fission Molybdenum for Medical Use" Oct. 1987.*
(Continued)

*Primary Examiner* — Sean P Burke
(74) *Attorney, Agent, or Firm* — Lewis Roca Rothgerber Christie LLP

(57) ABSTRACT

A process for minimizing waste and maximizing utilization of uranium involves recovering uranium from an irradiated solid target after separating the medical isotope product, molybdenum-99, produced from the irradiated target. The process includes irradiating a solid target comprising uranium to produce fission products comprising molybdenum-99, and thereafter dissolving the target and conditioning the solution to prepare an aqueous nitric acid solution containing irradiated uranium. The acidic solution is then contacted with a solid sorbent whereby molybdenum-99 remains adsorbed to the sorbent for subsequent recovery. The uranium passes through the sorbent. The concentrations of acid and uranium are then adjusted to concentrations suitable for crystallization of uranyl nitrate hydrates. After inducing the crystallization, the uranyl nitrate hydrates are separated from a supernatant. The process results in the purification of uranyl nitrate hydrates from fission products and other contaminants. The uranium is therefore available for reuse, storage, or disposal.

12 Claims, 1 Drawing Sheet

(51) Int. Cl.
G21G 1/04 (2006.01)
G21C 19/46 (2006.01)
G21G 1/00 (2006.01)

(56) References Cited

U.S. PATENT DOCUMENTS

| | | | |
|---|---|---|---|
| 3,745,119 | A | 7/1973 | Arino |
| 3,799,883 | A | 3/1974 | Arino |
| 4,093,697 | A | 6/1978 | Hadi et al. |
| 4,094,953 | A | 6/1978 | Hadi et al. |
| 4,176,158 | A | 11/1979 | Laidler et al. |
| 4,284,472 | A | 8/1981 | Pomares et al. |
| 4,701,308 | A | 10/1987 | Koehly et al. |
| 5,112,581 | A | 5/1992 | Ohuchi et al. |
| 5,508,010 | A | 4/1996 | Sameh et al. |
| 5,596,611 | A * | 1/1997 | Ball .............................. 376/189 |
| 6,033,636 | A | 3/2000 | Todokoro et al. |
| 7,011,798 | B2 | 3/2006 | Yano et al. |
| 8,328,900 | B2 | 12/2012 | Bednarski et al. |
| 8,450,629 | B2 | 5/2013 | Pitcher |
| 2003/0133860 | A1* | 7/2003 | Yano et al. ........................ 423/3 |
| 2011/0206579 | A1 | 8/2011 | Glenn et al. |
| 2011/0250107 | A1 | 10/2011 | Vernedoe et al. |
| 2012/0300891 | A1 | 11/2012 | Piefer |
| 2014/0112858 | A1* | 4/2014 | Policke et al. ................ 423/253 |
| 2015/0085963 | A1 | 3/2015 | Reilly |

FOREIGN PATENT DOCUMENTS

| | | |
|---|---|---|
| WO | 2013010047 | 1/2013 |
| WO | 2013095108 | 6/2013 |

OTHER PUBLICATIONS

Bakel et al., "Thernrioxid Sorbents for the separation and purification of 99Mo," a paper presented at RERTR, 26th International Meeting on Reduced Enrichment for Research and Test Reactors, Nov. 7-12, 2004, Vienna, Austria.
Cheng et al., "Study on the separation of Molybdenum-99 and Recycling of Uranium to Water Boiling Reactor," Appl. Radiat. Isot., vol. 40, pp. 315-324, 1989.
Chikazawa et al, "Batch crystallization of Uranyl Nitrate," J. Nucl. Sc. & Tech., vol. 45, pp. 582-587, 2008.
Cordfunke, "The system uranyl-sulphate-water-1 Preparation and characterization of the phases in the system," J. Inorg. Nucl. 31, pp. 1327-1335, 1969.
Dadachova et al., "Improved processes for molybdenum-99 production," J. Radioanal. Nucl. Chem, vol. 240, pp. 935-938, 1999.
Homma et al., "Flowsheet study of U-Pu Co-Crystallization Reprocessing System," J. Nucl. Sci. & Tech., 2008, vol. 45, pp. 510-517.
Hwang et al., "Separation of 99Mo from a simulated fission product solution by precipitation with α-benzoinoxime," J. Radioanal. Nucl. Chem., Nov. 2002, vol. 254, pp. 255-262.
McDonald et al., "Challenges of extracting and purifying fission produced Molybdenum99", Ind. Eng. Chem. Res., 2000, vol. 39, pp. 3146-3150.
Munze et al., "Large scale production of fission 99Mo by using elements of a research reactor as starting material," Int. J. Rad. App. Inst. Part A Appl. Rad. Isotopes, 1984, vol. 35, pp. 749-754.
Mullins et al., "Crystallization of uranium complexes for partitioning of spent nuclear fuel," in Eds. Lumetta, G.J. Nash, K.L., Clark, S.B. and Friese, J.I. "Separations in Nuclear Fuel Cycle in the 21st Century." (2006) ACS Symposium Series 933:183-200.
Nakahara et al., "Precipitation behavior of dicesium tetravalent plutonium hexanitrate in cooling crystallization of uranyl nitrate hexahydrate," Nuclear Technology, Feb. 2011, vol. 173, pp. 183-190.
Nakahara et al., "Purification rate of uranyl nitrate hexahydrate crystal for transuranium elements on isothermal sweating phenomenon," Ind. Eng. Chem., 2010, vol. 49, pp. 11661-11666, published on web Sep. 17, 2010.
Nakahara et al., "Enhancement of decontamination performance of impurities for uranyl nitrate hexahydrate crystalline particles by crystal purification operation," Nuclear Technology, Apr. 2011, vol. 174, pp. 77-84.
Nakahara et al., "Behavior of actinide elements and fission products in recovery of uranyl hexahydrate crystal by cooling crystallization method," Nuclear Technology, Apr. 2011, vol. 174, pp. 109-118.
Nakahara et al., "Removal of liquid and solid impurities from uranyl nitrate hexahydrate crystalline particles in crystal purification process," J. Nucl. Sci. & Tech., Mar. 2011, vol. 48, pp. 322-329.
Nakahara et al., "Effect of crystal size on purity of uranyl nitrate hexahydrate crystalline particles grown in nitric acid medium," Radiochim. Acta, 2012, vol. 100, pp. 821-826, published online Aug. 13, 2012.
Service, et al., "Scrambling to close the isotope gap," Science, 2010, vol. 331, pp. 277-279.
Vandergrift et al., "GTRI progress in technology development for conversion of 99Mo production to low enriched uranium," Paper presented at RERTR 2011—33rd International Meeting on Reduced Enrichment for Research and Test Reactors, Oct. 23-27, 2011, Santiago, Chile.
Van Der Walt et al., "The isolation of 99Mo from fission material for use in the 99Mo/99mTc generator for medical use," Radiochim. Acta, Apr. 2004, vol. 92, pp. 251-257.
Washiya et al., "Continuous-operation test at engineering scale uranium crystallizer system," Journal of Power and Energy Systems, vol. 4, No. 1, Mar. 18, 2010.
Wilkerson et al., "Study of Alumina use as a separation step in Mo-99 producjtion", (2002), Paper presented at RERTR, 24th International Meeting on Reduced Enrichment for Research and Test Reactors Nov. 3-8, Barilo-che, Argentina.
Yano et al., "Uranium crystallization test with dissolver solution of irradiated fuel," J. Nucl. Sci. & Tech., 2007, vol. 44, pp. 344-348.
IAEA-TecDoc-515, Fission Molybdenum for Medical Use, Proceedings of a Technical Committee Meeting organized by the International Atomic Energy Agency and held in Karlsruhe, Oct. 13-16, 1987.
IAEA-TecDoc-1051, Management of Radioactive Waste from 99Mo Production, International Atomic Energy Agency, printed by the IAEA in Austria, Nov. 1998.
IAEA-TecDoc-1601, Homogenous Aqueous Solution Nuclear Reactors for the Production of Mo-99 and other Short Lived Radioistotopes, International Atomic Energy Agency, printed by the IAEA in Austria, Sep. 2008.
Stepinski et al., "Design of Column Separation of Processes for Recovery of Molybdenum from Dissolved High Density LEU Target," Atomic Energy website, http://www.iaea.org/OurWork/ST/NE/NEFW/Technical-Areas/RRS/documents/mo99/STEPINSKIcolumnsepmo99.pdf. Argonne National Laboratory, Argonne, IL 2008.
U.S. Appl. No. 14/038,424 Office Action mailed Aug. 6, 2015.

* cited by examiner

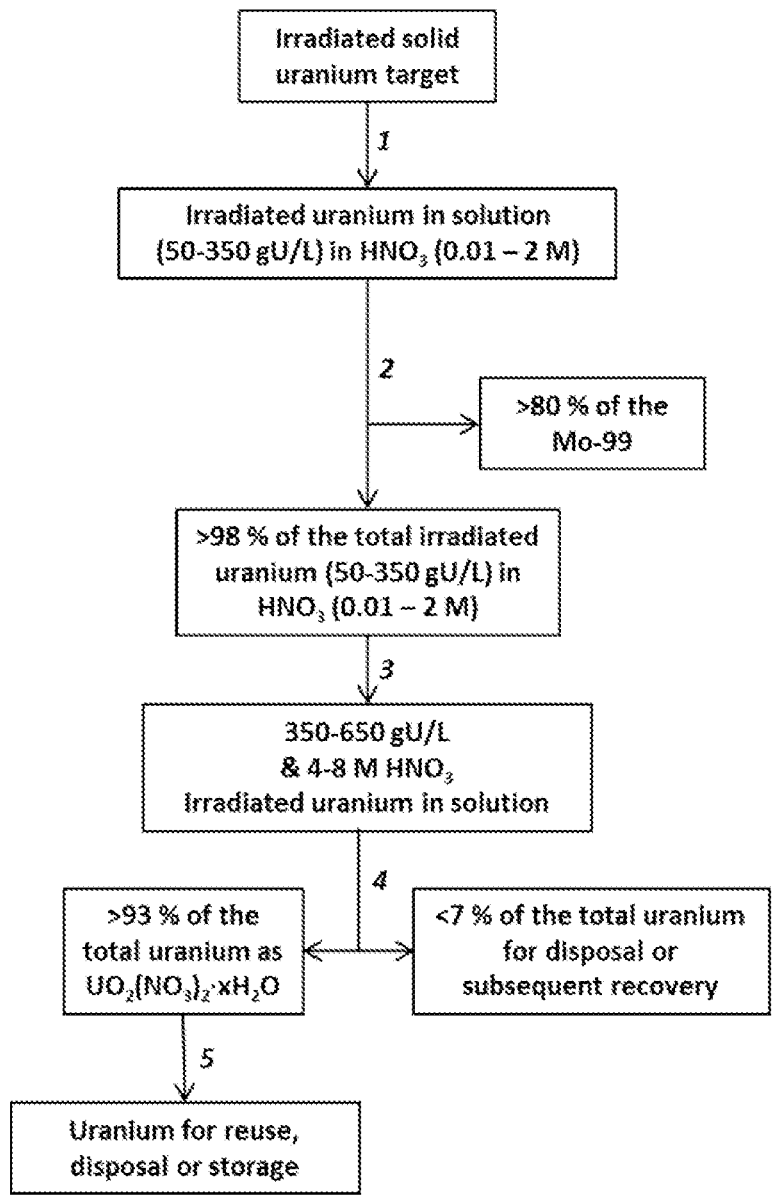

RECOVERY OF URANIUM FROM AN IRRADIATED SOLID TARGET AFTER REMOVAL OF MOLYBDENUM-99 PRODUCED FROM THE IRRADIATED TARGET

RELATED APPLICATIONS

This application is a continuation-in-part of copending U.S. patent application Ser. No. 14/038,424 entitled "Recovering and Recycling Uranium Used for Production of Molybdenum-99," filed Sep. 26, 2013, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the recovery of uranium from an irradiated solid target and more particularly to the recovery and purification of uranium from an irradiated solid target after removal of molybdenum-99 produced from the target.

BACKGROUND OF THE INVENTION

Technetium-99m ("Tc-99m") is the most commonly used radioisotope in nuclear medicine. Tc-99m is used in approximately two-thirds of all imaging procedures performed in the United States. Tens of millions of diagnostic procedures using Tc-99m are undertaken annually. Tc-99m is a daughter isotope produced from the radioactive decay of molybdenum-99 ("Mo-99"). Mo-99 decays to Tc-99m with a half life of 66 hours.

The vast majority of Mo-99 used in nuclear medicine in the U.S. is produced in aging foreign reactors. Many of these reactors still use solid highly enriched uranium ("HEU") targets to produce the Mo-99. HEU has a concentration of uranium-235 ("U-235") of greater than 20%. Maintenance and repair shutdowns of these reactors have disrupted the supply of Mo-99 to the U.S. and to most of the rest of the world. The relatively short half-life of the parent radioisotope Mo-99 prohibits the build-up of reserves. One of the major producers, The National Research Reactor in Canada, will cease production in 2016.

An alternative strategy for providing Mo-99 is based upon the use of low enriched uranium (LEU), which presents a much lower nuclear proliferation risk than HEU. LEU has a concentration of U-235 of less than 20%, and many international Mo-99 producers are converting from HEU to LEU solid targets for Mo-99 production.

Several of the technologies currently being considered for the domestic supply of Mo-99 are based on the fission of U-235 in LEU. In all processes being considered, only a small fraction of the U-235 present in the irradiated target will be consumed during irradiation. Fission of U-235 generates a variety of fission products, one of which is Mo-99.

Some form of enriched uranium (HEU and/or LEU) is used for the production of Mo-99. After the fission process, the remaining uranium is typically discarded along with other fission products as waste. Recovery and purification of the uranium would make it available for reuse, storage, or disposal.

Therefore, an object of the present invention is to provide a process for recovering, and purifying, uranium from an irradiated solid target after separating Mo-99 produced from the irradiated target.

BRIEF DESCRIPTION OF THE DRAWINGS

FIG. 1 provides a flow diagram of an embodiment process for recovery and purification of uranium from an irradiated solid target after separating Mo-99 produced from the irradiated target.

SUMMARY OF THE INVENTION

The embodiments for recovering uranium apply to recovering all isotopic ratios of uranium, including low-enriched uranium (LEU) as well as highly-enriched uranium (HEU). Enriched uranium refers to uranium enriched in isotope U-235.

An embodiment relates to a process for recovering uranium from an irradiated solid target, after recovering Mo-99 produced from the irradiated target. The process includes irradiating a solid target comprising uranium to produce fission products comprising Mo-99, and thereafter dissolving the target. Following dissolution, the solution is conditioned to provide an aqueous nitric acidic solution comprising a first acid concentration and a first uranium concentration. The uranium in the acidic solution will be in the +VI oxidation state and in the chemical form of the uranyl di-oxo di-cation ($UO_2^{2+}$). The acidic solution, along with the uranium, will pass through a solid sorbent, while Mo-99 is removed from the solution, remaining adsorbed to the sorbent. The Mo-99 will be recovered in a subsequent desorption step. After passing through the sorbent, the concentration of acid and uranium in the acidic uranium solution is adjusted to concentrations suitable for crystallization of uranyl nitrate hydrates. After inducing this crystallization of uranyl nitrate hydrates, the uranium contained in the uranyl nitrate hydrates is separated from a supernatant which contains soluble fission products. Thus the uranium is recovered and purified during this process, and is available for reuse, storage, or disposal.

The embodiment process for recovering uranium applies to recovering all isotopic ratios of uranium including LEU as well as HEU. Enriched uranium refers to uranium enriched in isotope U-235.

DETAILED DESCRIPTION

An embodiment process relates to recovery of uranium that has been used for the production of Mo-99 generated from the fission of U-235. Mo-99 undergoes radioactive decay to Tc-99m, the most widely used radioisotope in nuclear medicine. Recovery and purification of uranium allows for its reuse, storage, or disposal.

It should be understood that uranium includes both LEU (uranium having less than 20% of the U-235 isotope), and also HEU (uranium having greater than 20% of the U-235 isotope). Thus, an embodiment of the disclosed process may be used for recovery of either LEU or HEU.

An embodiment relates to a process for recovering uranium from a solid target that has been used for the production of Mo-99. The process employs a sorbent-based separation. The sorbent is used to remove Mo-99 prior to recovery and purification of the uranium. The process begins with irradiation of a solid target having fissionable uranium (i.e., U-235). The irradiation promotes fission of the U-235 to form fission products that include Mo-99.

After the irradiation the solid target is dissolved. The resultant solution is conditioned to provide an aqueous nitric acid solution of from about 0.01 M to about 2 M (M means moles of nitric acid per liter of solution). The uranium concentration of this solution is from about 50 gU/L to about 350 gU/L (gU/L means grams of uranium per liter of solution). The acidic solution, along with the uranium, will pass through a solid sorbent (e.g., a titania-based sorbent or an alumina-based sorbent), while Mo-99 is removed from the solution, remaining adsorbed to the sorbent. The Mo-99 will be recovered in a subsequent desorption step (e.g., washing the sorbent with an alkaline solution to strip the Mo-99 from the sorbent). The sorbent may be packed into a column, with processing solutions then flowing through the column.

After passing through the sorbent, and removal of the majority of the Mo-99, the aqueous nitric acid solution of from about 0.01 M to about 2 M, containing a uranium concentration of from about 50 gU/L to about 350 gU/L, is evaporated under vacuum and/or through heating. The resultant solution is acidified with a suitable amount of nitric acid, and water if needed, to yield a solution concentration of nitric acid of from about 4M to about 8M, and a uranium concentration of from about 350 gU/L to about 650 gU/L. The temperature of this solution may be raised to ensure that all the uranium remains in solution. This solution is then evaporated under reduced pressure and/or cooled in order to promote conditions suitable for the formation of crystals of uranyl nitrate hydrates from the solution. An example of such a uranyl nitrate hydrate is $UO_2(NO_3)_2 \cdot 6H_2O$. The crystals are then separated from the supernatant that remains and can be washed with nitric acid.

Most of the uranium from any solid uranium target suitable for the production of Mo-99 that can be dissolved, and then converted into a solution containing aqueous nitric acid of concentration from about 0.01 M to about 2 M and uranium of concentration from about 50 gU/L to about 350 gU/L, can be recovered using this crystallization process. Examples of suitable solid uranium targets include, but are not limited to, uranium metal foils, $U_3Si_2$ plates, $UAl_x$ targets and $UO_2$ targets. Through dissolution and subsequent chemical processing of the solid targets, a solution of irradiated uranium (50-350 gU/L) in nitric acid (0.01-2 M) can be prepared for recovery of Mo-99. After recovery of the majority of the Mo-99 using a sorbent, the remaining solution can be conditioned for crystallization of uranyl nitrate hydrates. Crystallization of uranyl nitrate hydrates removes most of the uranium from solution. The crystals can be filtered or otherwise removed from the supernatant and washed with nitric acid.

Only a small fraction of the U-235 component of the uranium undergoes fission during irradiation. Removal of the Mo-99 along with other fission products with the sorbent separation process provides a uranium-containing solution having a greatly reduced amount of fission products. Additionally, many fission products will remain soluble during uranium nitrate hydrates crystallization; including Ba-140, Zr-95, Ru-103 and Ce-141, and these fission products will thus be separated from uranium nitrate hydrates. Therefore, according to the present process, recovery of such a purified uranium product, as uranium nitrate hydrates, affords uranium for reuse, storage, or disposal. In the case of disposal, purification of the uranium nitrate hydrates reduces the hazardous nature of any eventual uranium waste form.

Nitric acid that is used in the process may also be recovered. Thus, nitric acid can also be recycled, further minimizing hazardous waste.

An embodiment process will allow (1) recovery of Mo-99 using a sorbent and (2) recovery of purified uranium from the irradiated target for reuse, storage, or disposal.

The concentrations of fission products and other impurities in the crystallized uranium nitrate hydrates may be too high for reuse, storage, or disposal. In this case further purification of the uranium nitrate hydrates crystalline material can be undertaken. Additional purification can be accomplished by a number methods including washing the crystals with nitric acid, heating the crystals to sweat out impurities prior to washing, and/or undertaking a second recrystallization process. In the latter case the uranyl nitrate hydrates solid would be dissolved in nitric acid, and the resulting solution would be conditioned to yield a 350-650 gU/L solution in a nitric acid concentration of between 4-8 M prior to crystallization through concentration by evaporation under reduced pressure and/or by cooling.

80% or greater of the Mo-99 produced from the U-235 fission in a solid uranium target (not corrected for radioactive decay) may be recovered after a sorbent-based separation, and 93% or greater of the uranium may be recovered in a purified form.

After the solid target irradiation and dissolution, a crude Mo-99 product is separated from the uranium using a sorbent. Additional purification steps on the crude Mo-99 will result in a pure Mo-99 product for use in Tc-99m generators. In an embodiment, a solution of uranium in nitric acid may be concentrated through evaporation and acidified to a concentration of nitric acid of between 4 M and 8 M and uranium in an amount of, for example, 500 gU/L. Cooling to a temperature effective for crystallization, forming crystals of uranyl nitrate hydrates, an effective temperature being a temperature of from about 10° C. to about −30° C. (e.g., −10° C.) allows crystallization of 93% or greater of the uranium as uranyl nitrate hydrates, which is a largely insoluble salt at such cold temperatures. Evaporation under reduced pressure may be used as a means of both cooling the solution and lowering solution volume to increase the percentage of uranyl nitrate hydrates crystallized from solution. The crystals of uranyl nitrate hydrates are filtered from the supernatant that remains.

An inorganic oxidant may be added to the solution of irradiated uranium (50-350 gU/L) in nitric acid (0.01-2 M) to ensure all of the Mo-99 is in the +VI oxidation state. +VI is the preferred oxidation state for the separation of Mo-99 from the uranium in nitric acid, in the sorbent separation step. Suitable inorganic oxidants include potassium permanganate, hydrogen peroxide, and sodium persulfate.

In another embodiment, a uranium solution could be irradiated instead of a solid target to generate Mo-99. In this case the solution containing irradiated uranium can be conditioned to produce a solution of uranium (50-350 gU/L) in nitric acid (0.01-2 M) suitable for sorbent recovery of Mo-99. After recovery of the majority of the Mo-99 using a sorbent, the remaining solution can be conditioned for crystallization of uranyl nitrate hydrates. The purified uranium nitrate hydrates from the irradiated uranium solution is then available for reuse, storage, or disposal.

FIG. 1 provides a flow diagram for an embodiment process. The boxes refer to a particular material and the numbers 1 through 5, which are in between boxes refer to process steps. Thus, the topmost box refers to an irradiated solid target of enriched uranium. After target irradiation, step 1 refers to the irradiated uranium target dissolution, and conditioning to form an aqueous nitric acid solution having a concentration of from about 0.01 M to about 2 M (e.g., 0.5 M). The concentration of uranium would be from about 50 gU/L to about 350 gU/L. Next, process step 2 involves removal of greater than 80% of the Mo-99 (not corrected for radioactive decay) from the solution using a solid sorbent-based separation process. >98% of the uranium remains in the nitric solution and is subjected to process step 3. Process step 3 involves conditioning the solution by increasing the concentration of uranium nitrate to a concentration of from about 350 gU/L to about 650 gU/L and increasing the concentration of nitric acid to a concentration of from about 4 M to about 8 M. These results may be achieved by evaporation using heat and/or evaporation under a reduced pressure and addition of nitric acid. This solution may be held at above ambient temperature (e.g., 40° C.) to be sure all of the uranium is dissolved. Process step 4 is performed on the now more concentrated solution, and results in crystallization to form crystals of uranyl nitrate hydrates, and a supernatant. The uranyl nitrate hydrates contain greater than 93% of the uranium. The supernatant contains less than 7% of the uranium which can be subsequently recovered, if required. Process step 5 results in uranium for reuse, storage, or disposal.

The aforementioned embodiments relate to the irradiation of solutions of uranium and subsequent recovery of Mo-99 for generating Tc-99m, and thus relate to satisfying an objective of using LEU for generating Mo-99 and subsequent reuse, disposal, or storage of the LEU.

Although the present invention has been described with reference to specific details, it is not intended that such details should be regarded as limitations upon the scope of the invention, except as and to the extent that they are included in the accompanying claims.

What is claimed is:

1. A process for recovering uranium and molybdenum-99 (Mo-99) from an irradiated solid target, comprising:
    irradiating a solid target comprising uranium to produce the irradiated solid target having fission products comprising Mo-99;
    dissolving the irradiated solid target to form a first solution and conditioning the first solution to comprise a first nitric acid concentration and a first uranium concentration;
    oxidizing the Mo-99 by adding an inorganic oxidant to the first solution to provide a second solution in which the Mo-99 is in a +VI oxidation state;
    contacting the second solution with a solid sorbent, whereby uranium remains in the second solution while the Mo-99 is bound to the solid sorbent;
    adjusting the first nitric acid concentration and the first uranium concentration in the second solution to provide a second nitric acid concentration and a second uranium concentration suitable for formation of uranyl nitrate hydrate crystals;
    inducing formation of uranyl nitrate hydrate crystals; and
    separating the uranyl nitrate hydrate crystals from the second solution.

2. The process of claim 1, wherein the inducing formation of uranyl nitrate hydrate crystals comprises cooling the second solution to a temperature effective for the formation of the uranyl nitrate hydrate crystals.

3. The process of claim 1, wherein the inducing formation of uranyl nitrate hydrate crystals comprises evaporating the second solution under reduced pressure.

4. The process of claim 1, further comprising purifying the uranyl nitrate hydrate crystals after separating the uranyl nitrate hydrate crystals.

5. The process of claim 1, wherein the uranium comprises low-enriched uranium (LEU).

6. A process for recovering uranium and Mo-99 from an irradiated solid target, comprising:
    irradiating a solid target comprising uranium to produce the irradiated solid target having fission products comprising Mo-99;
    dissolving the irradiated solid target to form a first solution and conditioning the first solution to comprise a nitric acid concentration of about 0.01 M to about 2 M, and a uranium concentration of about 50 gU/L to about 350 gU/L;
    oxidizing the Mo-99 by adding an inorganic oxidant to the first solution to provide a second solution in which the Mo-99 is in a +VI oxidation state;
    contacting the second solution with a solid sorbent, whereby uranium remains in the second solution while the Mo-99 is bound to the solid sorbent;
    adjusting the nitric acid concentration in the second solution to about 4 M to about 8 M, and the uranium concentration in the second solution to about 350 gU/L to about 650 gU/L;
    inducing formation of uranyl nitrate hydrate crystals; and
    separating the uranyl nitrate hydrate crystals from the second solution.

7. The process of claim 6, wherein the inducing formation of uranyl nitrate hydrate crystals comprises cooling the second solution to a temperature effective for the formation of the uranyl nitrate hydrate crystals.

8. The process of claim 6, wherein the inducing formation of uranyl nitrate hydrate crystals comprises evaporating the second solution under reduced pressure.

9. The process of claim 6, further comprising purifying the uranyl nitrate hydrate crystals after separating the uranyl nitrate hydrate crystals.

10. The process of claim 6, wherein the uranium comprises LEU.

11. The process of claim 1, further comprising recycling the nitric acid.

12. The process of claim 6, further comprising recycling the nitric acid.

* * * * *